US012343994B2

(12) United States Patent
Hirabayashi et al.

(10) Patent No.: US 12,343,994 B2
(45) Date of Patent: Jul. 1, 2025

(54) LIQUID DISCHARGE HEAD, HEAD MODULE, LIQUID DISCHARGE UNIT, AND LIQUID DISCHARGE APPARATUS

(71) Applicants: Takuma Hirabayashi, Tokyo (JP); Akio Yoshita, Kanagawa (JP); Takahiko Kuroda, Hyogo (JP)

(72) Inventors: Takuma Hirabayashi, Tokyo (JP); Akio Yoshita, Kanagawa (JP); Takahiko Kuroda, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 126 days.

(21) Appl. No.: 18/103,497

(22) Filed: Jan. 31, 2023

(65) Prior Publication Data

US 2023/0278337 A1 Sep. 7, 2023

(30) Foreign Application Priority Data

Mar. 2, 2022 (JP) ................................ 2022-031573

(51) Int. Cl.
*B41J 2/14* (2006.01)

(52) U.S. Cl.
CPC ......... *B41J 2/1433* (2013.01); *B41J 2/14201* (2013.01); *B41J 2002/14306* (2013.01); *B41J 2002/14362* (2013.01)

(58) Field of Classification Search
CPC .......... B41J 2/14201; B41J 2002/14306; B41J 2002/14362; B41J 2002/14419; B41J 2/14233; B41J 2002/14241; B41J 2/175; B41J 2002/14491; B41J 2202/20; B41J 2/1623; B41J 2/1433; B41J 2/14274; B41J 2/14; B41J 2/1607; B41J 2202/19; B41J 2202/22
See application file for complete search history.

(56) References Cited

U.S. PATENT DOCUMENTS

2008/0198209 A1* 8/2008 Mizoguchi ........... B41J 2/14209 347/85
2017/0306471 A1 10/2017 Abe et al.
2018/0117915 A1 5/2018 Takeuchi et al.
2020/0031113 A1 1/2020 Kondo et al.
2022/0242123 A1 8/2022 Hirabayashi et al.
2022/0348012 A1* 11/2022 Yamamoto ............. B41J 2/1433

FOREIGN PATENT DOCUMENTS

JP 2002-052707 2/2002
JP 2011-049397 3/2011
JP 2015-013396 1/2015

* cited by examiner

*Primary Examiner* — Jannelle M Lebron
(74) *Attorney, Agent, or Firm* — XSENSUS LLP

(57) ABSTRACT

A liquid discharge head includes: a support member including a first recess and a second recess; and a damper member bonded to the support member, the damper member including a damper membrane, wherein the first recess faces the damper membrane, and the second recess is closer to an end of the support member than the first recess in a longitudinal direction of the support member, and the second recess does not face the damper membrane.

12 Claims, 10 Drawing Sheets

LIQUID DISCHARGE HEAD, HEAD MODULE, LIQUID DISCHARGE UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-031573, filed on Mar. 2, 2022, in the Japan Patent Office, the entire disclosure of which is hereby incorporated by reference herein.

BACKGROUND

Technical Field

The present embodiment relates to a liquid discharge head, a head module, a liquid discharge unit, and a liquid discharge apparatus.

Related Art

Liquid discharge heads implement measures to reduce the pressure as much as possible because pressure generation affects droplet formation during discharge. One of the measures is a damper member including a damper membrane (also referred to as “membrane”, etc.) that functions to vibrate under the pressure to reduce the vibrations.

The damper member is bonded to, for example, a support member having a vibration area for the damper membrane. The support member is often precisely fabricated using, for example, Si and bonded to the damper member including the damper membrane, which is patterned to a few μm, with an adhesive, or the like. There are also methods for forming integrated components by bonding films of several μm to the support member using a microelectromechanical system (MEMS) process, or the like.

There is a disadvantage in mechanical strength when the damper membrane is formed over a large area in the damper member. In particular, handling during assembling (e.g., handling a member) may easily damage the damper membrane, and when a damage occurs, may cause foreign matter and may result in a failure to use the product in some cases. To solve this issue, a structure, e.g., a reinforcing portion in an opening, is provided to form a reinforcing structure in the membrane for the purpose of improving the mechanical strength of the membrane.

SUMMARY

In an aspect of the present disclosure, a liquid discharge head includes: a support member including a first recess and a second recess; and a damper member bonded to the support member, the damper member including a damper membrane, wherein the first recess faces the damper membrane, and the second recess is closer to an end of the support member than the first recess in a longitudinal direction of the support member, and the second recess does not face the damper membrane.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
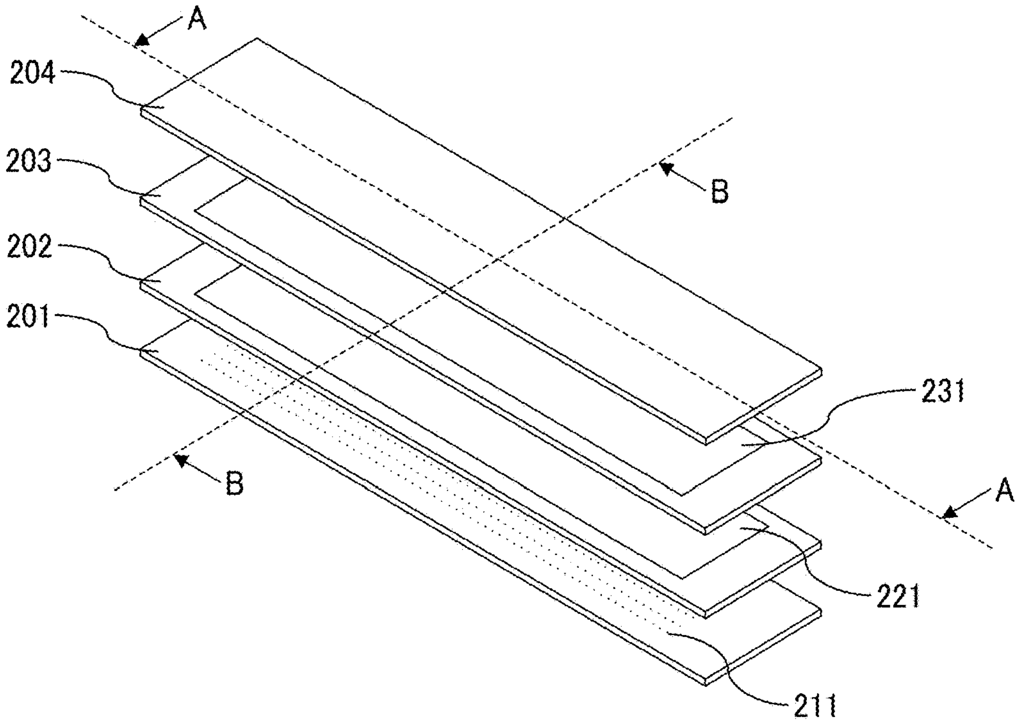
FIG. 1 is a schematic, perspective, and exploded view of an example of a liquid discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

A liquid discharge head, a head module, a liquid discharge unit, and a liquid discharge apparatus according to the present embodiment will be described below referring to the drawings. The present embodiment is not limited to the embodiment described below, and other embodiments, additions, modifications, deletions, and the like, may be made to the extent that those skilled in the art can conceive. Any of these forms are included in the scope according to the present embodiment as long as the function and the effect according to the present embodiment are achieved.

The liquid discharge head according to the present embodiment is a liquid discharge head including a support member and a damper member bonded to the support member. The damper member includes a damper membrane. The support member includes a first recess and a second recess on a side of the damper member. The first recess is provided at an area opposed to the damper membrane. The second recess is located closer to an end side of the support member than the first recess and is provided at an area where the damper membrane is not provided.

The damper membrane may also be referred to as “membrane” or simply as “damper”.

FIG. 1 is a diagram illustrating a liquid discharge head according to the present embodiment. FIG. 1 is a schematic, perspective, and exploded view of the liquid discharge head according to the present embodiment. The liquid discharge head according to the present embodiment includes a nozzle substrate 201, an actuator substrate 202, a damper member 203, and a support member 204.

The nozzle substrate 201 includes a nozzle 211 that discharges a liquid (e.g., ink).

The actuator substrate 202 includes a common chamber 221 and is bonded to the nozzle substrate 201 and the damper member 203. The common chamber 221 is schematically illustrated and is not limited to the one illustrated.

The support member 204 includes recesses described below and is bonded to the damper member 203. The support member may be referred to as “frame member”, etc.

The damper member 203 includes a damper membrane 231 and is bonded to the support member 204 with an adhesive. The damper member 203 is bonded to the actuator substrate 202 on the opposite side of the side where the damper member 203 is bonded to the support member 204. For example, the damper member 203 may include Si.

The damper membrane 231 forms, for example, part of a wall surface of the common chamber 221 when the damper member 203 and the actuator substrate 202 are bonded together. The shape of the damper membrane 231 is schematically illustrated and is not limited to the one illustrated.

The use of the damper member 203 allows the damper membrane 231 to vibrate so as to suppress the vibrations of the liquid. For example, the use of the damper member 203 may suppress the vibrations of the liquid flowing through a tributary (channel) formed on the actuator substrate 202. When one nozzle unit is regarded as a channel, it is possible to suppress the propagation of the vibrations generated in one channel to another channel.

The damper member 203 may include, for example, Si fabricated by using the MEMS process. The damper member 203 may include, for example, an Si damper member in which the thin damper membrane 231 (membrane) is formed. The damper member 203 and the support member 204 may be fabricated as a single component, bonded with an adhesive, or fabricated by being directly bonded. For example, the damper membrane 231 may be directly formed by chemical vapor deposition (CVD), or the like, and then a cavity (a first recess 261) may be formed to form the damper member 203. Integral bonding using heating, pressurization, or the like, may be used to bond the damper member 203 and the support member 204.

Next, the damper membrane will be described referring to FIGS. 2 and 3. Although FIGS. 2 and 3 are included in the present embodiment, a second recess and a third recess described below are omitted.

Figure 2:
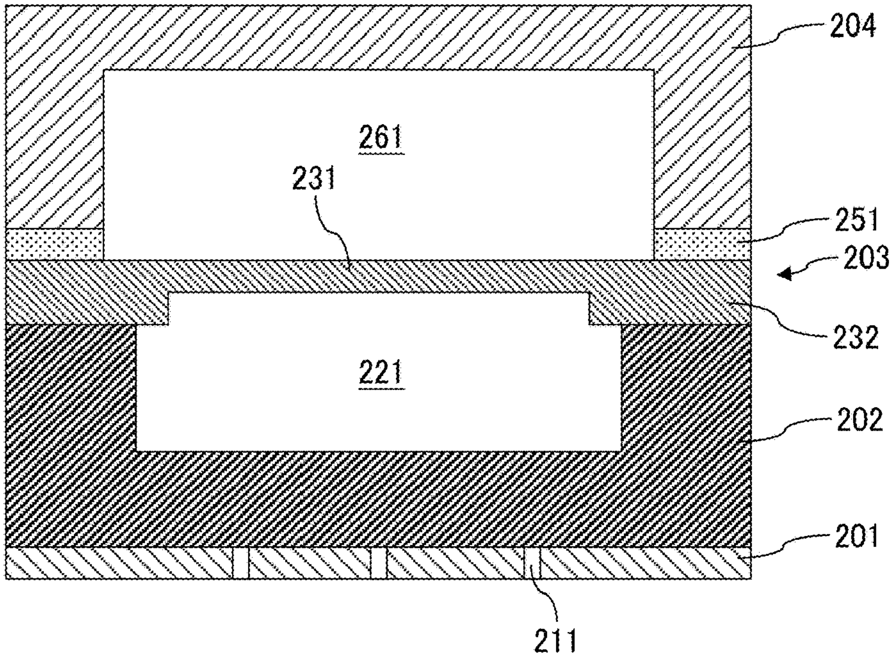
FIG. 2 is a schematic, cross-sectional view of an example of the liquid discharge head according to the present embodiment.

FIG. 2 is a schematic, cross-sectional view of the liquid discharge head according to the present embodiment along a nozzle array direction and is a view taken through AA of FIG. 1. FIG. 3 is a schematic, cross-sectional view of the liquid discharge head according to the present embodiment in a direction perpendicular to the nozzle array direction and is a view taken through BB of FIG. 1.

Figure 5A:
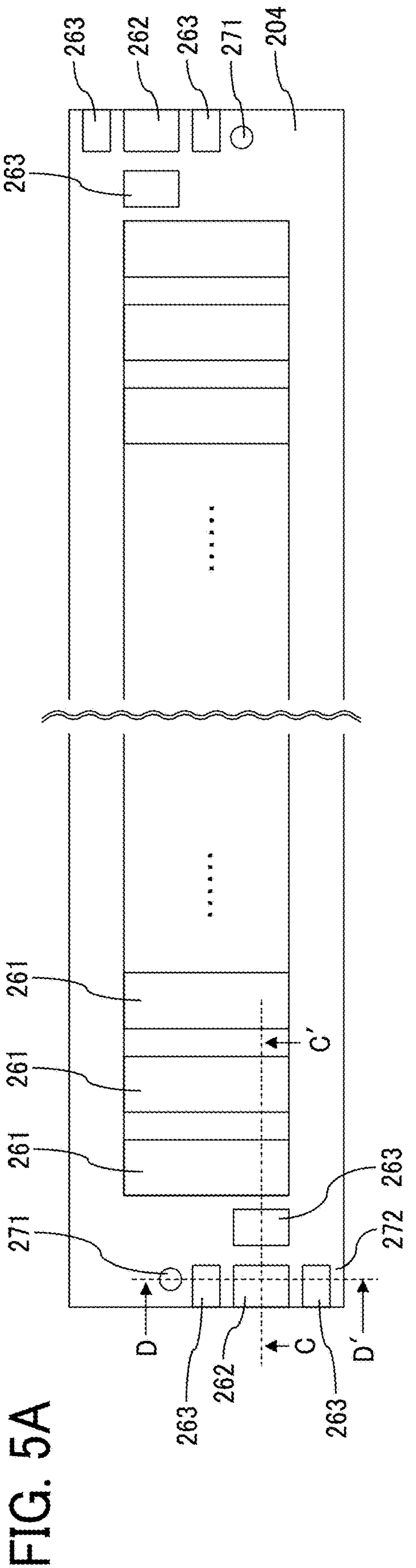
FIG. 5A is a schematic, plan view of an example of a support member according to the present embodiment.
Figure 5B:
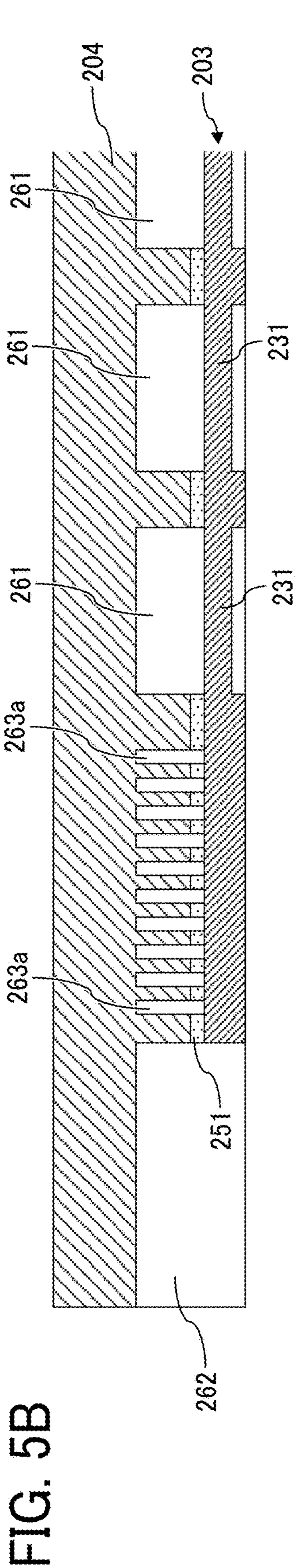
FIG. 5B is a schematic, cross-sectional view of the support member and a damper member according to the present embodiment.

As illustrated in the figure, the support member 204 includes the first recess 261. The first recess 261 is provided so as to prevent the damper membrane 231 from being in contact with the support member 204 when, for example, the damper membrane 231 is deformed. The first recess 261 may also be referred to as “cavity”, “damper chamber”, etc. FIGS. 2 and 3 are schematic diagrams, and a plurality of the first recess 261 may be provided as illustrated in FIGS. 5A and 5B below.

Figure 3:
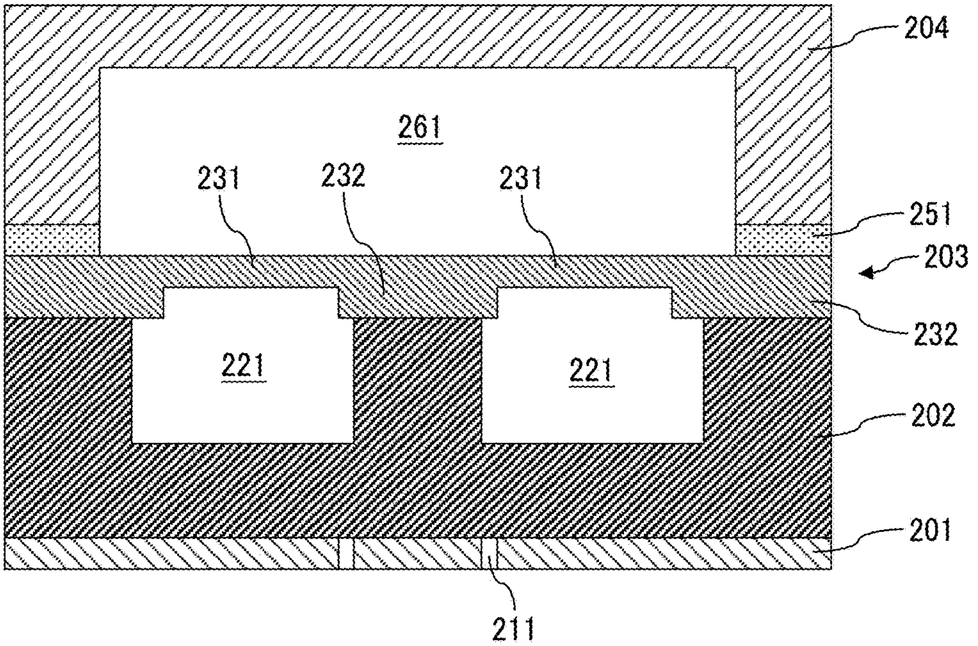
FIG. 3 is a schematic, cross-sectional view of an example of the liquid discharge head according to the present embodiment.

In the example illustrated in FIGS. 2 and 3, the support member 204 and the damper member 203 are bonded with an adhesive 251. As described above, the present embodiment is not limited to the case where the support member 204 and the damper member 203 are bonded using an adhesive, but also includes the case where the support member 204 and the damper member 203 are directly bonded or bonded without an adhesive.

The actuator substrate 202 includes the common chamber 221, and when the damper member 203 is bonded to the actuator substrate 202, the damper membrane 231 forms part of the wall surface of the common chamber 221. For example, when the vibrations occur in the liquid in the common chamber 221, the damper membrane 231 may vibrate to suppress the vibrations of the liquid. It is possible to reduce the pressure propagation to adjacent channels and the changes in response to ink flow volume changes. For example, it is possible to reduce the pressure changes in liquid chambers and channels in the actuator substrate 202.

The damper member 203 includes, for example, the damper membrane 231 and a peripheral thick portion 232. The peripheral thick portion 232 is an area bonded to the actuator substrate 202. The peripheral thick portion 232 improves the bonding with the actuator substrate 202 and the support member 204, but the peripheral thick portion 232 may be omitted.

In the example illustrated in the figure, only the common chamber 221 is illustrated in the actuator substrate 202, but the actuator substrate 202 may additionally include individual chambers, piezoelectric elements, channels, etc. For example, the individual chamber communicates with the nozzle 211 included in the nozzle substrate 201. The shape, arrangement, and number of the nozzles 211 are not limited to those illustrated in the figure and may be selected as appropriate.

Figure 4:
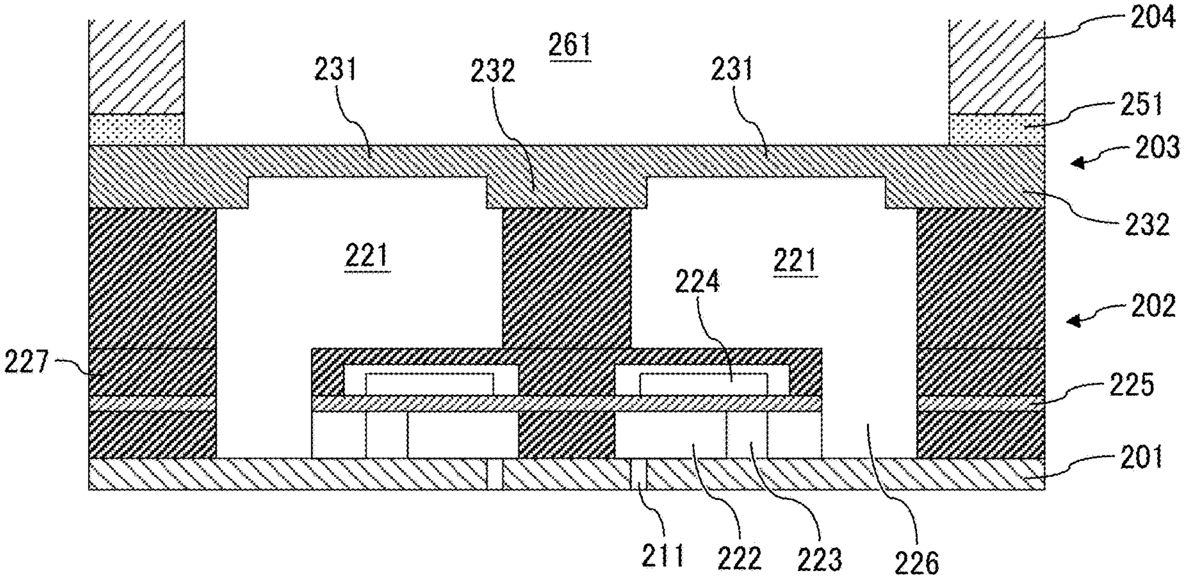
FIG. 4 is another schematic, cross-sectional view of an example of the liquid discharge head according to the present embodiment.

FIG. 4 is another figure for illustrating the liquid discharge head according to the present embodiment. FIG. 4 is a schematic, cross-sectional view to illustrate the actuator substrate 202 in FIG. 3. Although FIG. 4 is included in the present embodiment, the second recess and the third recess described below are omitted.

As illustrated in the figure, the actuator substrate 202 includes, for example, a diaphragm 225 and a channel plate 227. The actuator substrate 202 includes an individual chamber 222, a fluid restrictor 223, a piezoelectric element 224 (pressure generator), a channel 226, etc. The individual chamber 222 communicates with the nozzle 211. An introduction channel is provided between the channel 226 and the fluid restrictor 223. The introduction channel introduces the liquid from the channel 226 (common channel) to the fluid restrictor 223. In this example, the piezoelectric element 224 applies the pressure to the liquid in the individual chamber 222 to discharge the liquid through the nozzle 211. The liquid is supplied from the common chamber 221 to the individual chamber 222 through the channel 226.

Next, a detailed example of the liquid discharge head according to the present embodiment will be described referring to FIG. 5A to 5C.

FIG. 5A is a schematic, plan view of the support member 204 when viewed from a stacking direction of the support member 204 and the damper member 203. FIG. 5B is a schematic, cross-sectional view taken through CC' in FIG. 5A. FIG. 5C is a schematic, cross-sectional view taken through DD' of FIG. 5B.

As illustrated in the figure, the support member 204 includes the first recess 261 and a second recess 262 on the side of the damper member 203. The first recess 261 is opposed to the damper membrane 231 to obtain a vibration area for the damper membrane 231. The second recess 262 is located closer to an end side of the support member 204 than the first recess 261 and is provided at an area where the damper membrane 231 is not provided.

As described above, the first recess 261 is provided so as to prevent the damper membrane 231 from being in contact with the support member 204 when, for example, the damper membrane 231 is deformed. As illustrated in the figure, a plurality of the first recesses 261 is provided. The number, shape, and the like, of the first recesses 261 are not limited in particular and may be changed as appropriate.

The second recess 262 is located closer to the end side of the support member 204 than the first recess 261 and is provided at an area where the damper membrane 231 is not provided. The second recess 262 is provided on the outer side of the first recess 261 so that the second recess 262 may serve as an area enabling handling (also referred to as "handling area") so as to prevent damages during handling. This point will be described below.

The support member 204 and the damper member 203 are fabricated as wafers by for example the MEMS process, and the components forming the liquid discharge head are chips of these wafers. The support member 204 has various patterns formed therein, such as the vibration area (damper chamber) of the damper membrane, an escape portion for the adhesive, and patterns for alignment. Therefore, for example, in the single component of the support member 204 and the damper member 203, there is an area where only the damper membrane 231 is present. For example, in the damper member 203, only the damper membrane 231 is present without being in contact with the support member 204 at the area opposed to the damper chamber of the support member 204. In addition, only the damper membrane 231 is present in the same manner in the escape portion for the adhesive, etc.

Such an area where only the damper membrane 231 is present is very easy to get damaged. For example, during handling of the single component of the support member 204 and the damper member 203, the area is likely to get damaged when the area is held or contacted by, for example, an arm for assembling. For example, when the damper membrane opposed to the escape portion for the adhesive is located closer to the outer side (the end side) of the member than the damper chamber, the escape portion for the adhesive is likely to come into contact with the arm for assembling, or the like, and is likely to get damaged during handling. The damper membrane on the outer side of the member is likely to get damaged during handling in the same manner.

The term "handling" refers to supporting, pressing, moving, and the like, of the support member and the damper member during assembling. The term "handling" may also refer to simply handling the member. The term "handling" may also refer to the above operation performed for, not only assembling, but also inspecting, simply moving the member, fabricating the member, etc. Handling is not limited in particular, but is performed, for example, by an arm for assembling, a tool for picking up, or an arm of an automatic machine.

Damage to portions other than the damper membrane may cause no functional disadvantage, but the damaged membrane may become foreign matter, which may result in a lower yield. Therefore, it is desirable to achieve handling safely without affecting the function, yield, etc.

According to the present embodiment, the second recess 262 may be an area enabling handling (handling area) so that damages during handling may be prevented. Furthermore, as the handling area is provided on the outer side of the first recess 261, it is possible to prevent the effect on the damper function and the discharge property.

According to the present embodiment, the second recess 262 is provided at an area where the damper membrane 231 is not provided so that the handling area may be easily recognized and identified. When the handling area is an area where the damper membrane 231 is provided, it is difficult to recognize and identify the handling area after the support member 204 and the damper member 203 are bonded together. Therefore, the present embodiment has advantages of increased visibility of the handling area and reliable handling.

The first recess 261, the second recess 262, and a third recess 263 described below may be formed using the same processing method. Therefore, it is possible to prevent changes made to the processing method for each recess and it is possible to prevent an increase in process load. Each recess may be fabricated by changing the mask for processing during the semiconductor process, and there is no need to add a new process for the structure without a handling area. Furthermore, for example, there is no need to provide a reinforcing structure in the damper chamber, and it is possible to prevent design difficulties.

As described above, according to the present embodiment, it is possible to obtain the liquid discharge head that uses the member that is easy to handle while preventing the increased load of fabrication so as to prevent damages to the member. As described above, as the second recess 262 is provided on the outer side of the first recess 261, it is possible to fabricate the component suitable for handling without affecting the function of the damper membrane, e.g., the vibration property of the damper membrane. As described above, even when the second recess 262 is formed, the fabrication process itself is the same as that when the second recess 262 is not formed, and thus an increase in the process load may be prevented.

The size, number, position, and the like, of the first recesses 261 may be changed as appropriate. In the example illustrated in FIG. 5A, the plurality of first recesses 261 is arranged along the longitudinal direction of the support member 204, but the embodiment is not limited thereto, and changes may be made as appropriate. The damper membrane 231 is provided corresponding to the first recess 261 on the central side of the damper member 203. The damper member 203 includes, for example, an Si damper member including the damper membrane 231 (membrane) having an overall large area. Damages may be prevented even when the damper membrane having a large area is provided as described above.

The size, number, and the like, of the second recesses 262 may be changed as appropriate. The opening of the second recess 262 is preferably square or rectangular when viewed from the stacking direction of the support member 204 and the damper member 203. In the example illustrated in FIG. 5A, the second recess 262 has the rectangular opening. The size of the opening of the second recess 262 may be selected as appropriate in consideration of how handling is to be performed, etc. When the opening of the second recess 262 is square or rectangular, one side of the opening is preferably 1200 μm or more. A fixed area may facilitate handling and improve handling performance.

In the example illustrated in FIG. 5A, the support member 204 has a longitudinal side and a transverse side when viewed from the stacking direction of the support member 204 and the damper member 203. The area where the second recess 262 is formed may be selected as appropriate and is not limited to the example illustrated in FIGS. 5A to 5C.

As illustrated in FIG. 5A, the second recess 262 may be located closer to the end side of the support member 204 than the first recess 261 and provided on the two end sides in the longitudinal direction. In the example illustrated in FIG. 5A, the second recesses 262 are provided on the two end sides in the longitudinal direction, i.e., at two areas on the end sides in the longitudinal direction. In this case, there is an advantage such that the chip may be handled from both directions along the longitudinal direction and easy handling is achieved.

Also, unlike the example illustrated in FIG. 5A, the second recess 262 may be located closer to the end side of the support member 204 than the first recess 261 and provided on only one of the two end sides in the longitudinal direction. In this case, there is an advantage such that the range to be in contact with the chip by handling is more limited and thus the effect of foreign matter may be reduced to the minimum. As the second recess 262 is provided on only one side, foreign matter may be prevented from adhering to the second recess 262.

Figure 5C:
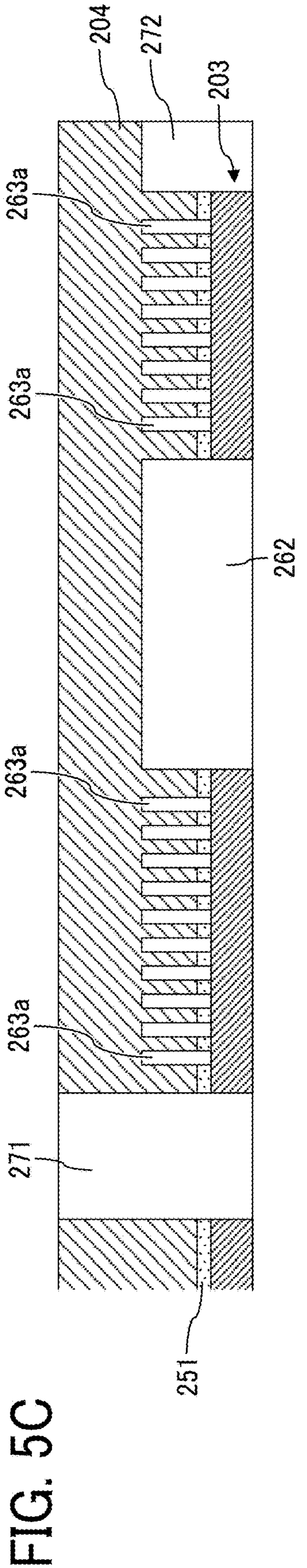
FIG. 5C is another schematic, cross-sectional view of the support member and the damper member according to the present embodiment.

In the cross-sectional view illustrated in FIG. 5B, the second recess 262 may have an incomplete recessed shape, but in the cross-sectional view illustrated in FIG. 5C, the second recess 262 has a recessed shape, and therefore it can be said that the second recess 262 in the example illustrated in the figure has a recessed shape.

In the liquid discharge head according to the present embodiment, the support member 204 and the damper member 203 may be bonded together with an adhesive. In this case, the support member 204 preferably includes the third recess on the side of the damper member 203. The third recess may obtain the escape portion for the adhesive.

A plurality of third recesses 263*a* is preferably provided adjacent to each other, located closer to the end side of the support member 204 than the first recess 261, and provided at the area opposed to the damper membrane 231 to obtain the escape portion for the adhesive 251. The third recess 263*a* is located closer to the end side of the support member 204 than the first recess 261 and provided at the area opposed to the damper membrane 231. In FIG. 5A, the third recess 263 is illustrated, and the area where the third recesses 263*a* are formed is schematically illustrated. In the area illustrating the third recess 263 in FIG. 5A, the plurality of third recesses 263*a* is provided adjacent to each other.

The third recess 263*a* is provided to allow the excess adhesive to escape when the support member 204 and the damper member 203 are bonded together and to achieve desirable bonding. The third recess 263*a* may also be referred to as "escape portion for the adhesive", or the like. The third recess 263*a* is located closer to the end side of the support member 204 than the first recess 261, and therefore there is no need to, for example, change the arrangement configuration of the liquid chamber and the damper membrane.

The plurality of third recesses 263*a* is arranged adjacent to each other so as to allow the adhesive to escape efficiently and allow the members to be bonded together in a desirable manner. When there is the one third recess 263*a*, it is difficult to let the adhesive escape sufficiently, which may result in undesirable bonding.

As the third recess 263*a* does not obtain a vibration area of the damper membrane 231, the third recess 263*a* may be referred to as "dummy pattern", or the like. Although not limited in particular, the third recess 263*a* is formed at, for example, the area corresponding to the peripheral thick portion 232 of the damper member 203.

The size, number, and the like, of the third recesses 263 may be changed as appropriate. For example, the area of the opening of the third recess 263 is preferably smaller than the area of the opening of the first recess 261. Thus, it is easy to obtain the area of the damper membrane 231.

In the example illustrated in FIG. 5A, a temporary bonding area 272 is located even closer to the end side of the member than the third recess 263 on the line DD'. The temporary bonding area 272 is optional. For example, the temporary bonding area 272 is used for temporarily bonding the support member 204 and the damper member 203 when a UV adhesive is applied. The example in FIGS. 5A and 5C illustrates an alignment hole 271. The alignment hole 271 is used to align the chips when the chips are bonded together.

Figure 6:
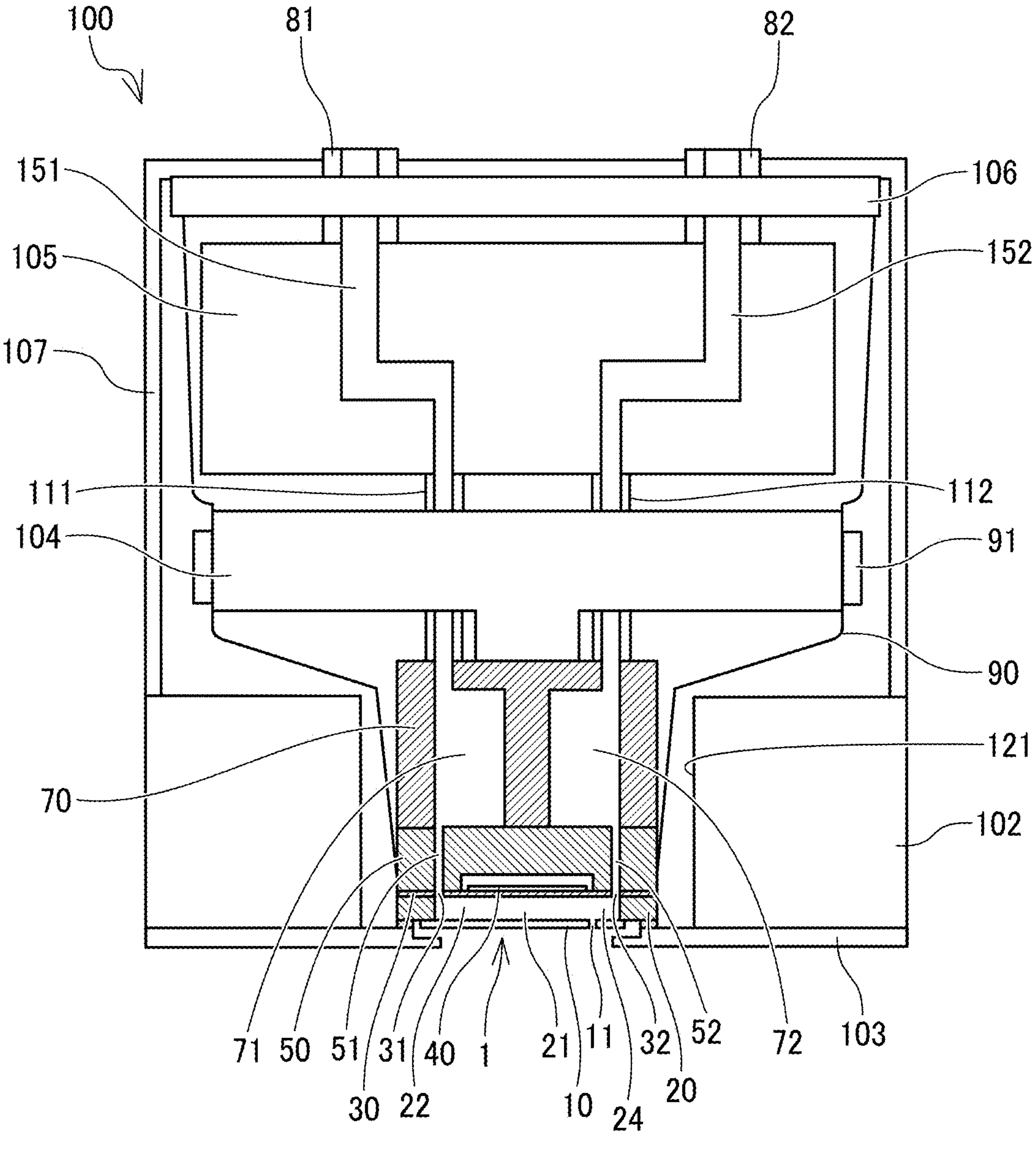
FIG. 6 is a cross-sectional view of an example of a head module according to the present embodiment along a head transverse direction.
Figure 7:
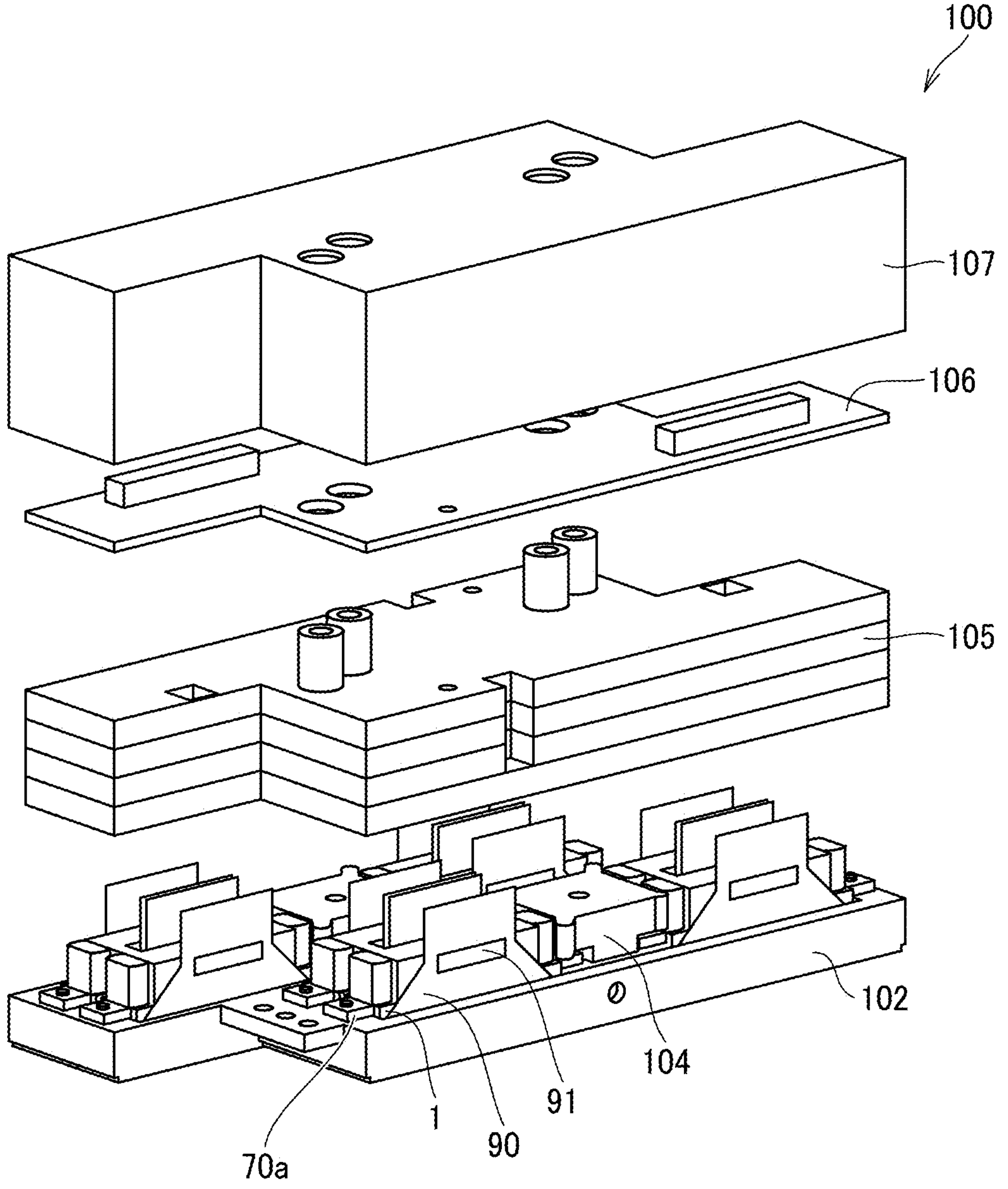
FIG. 7 is a perspective, exploded view of the head module according to the present embodiment.
Figure 8:
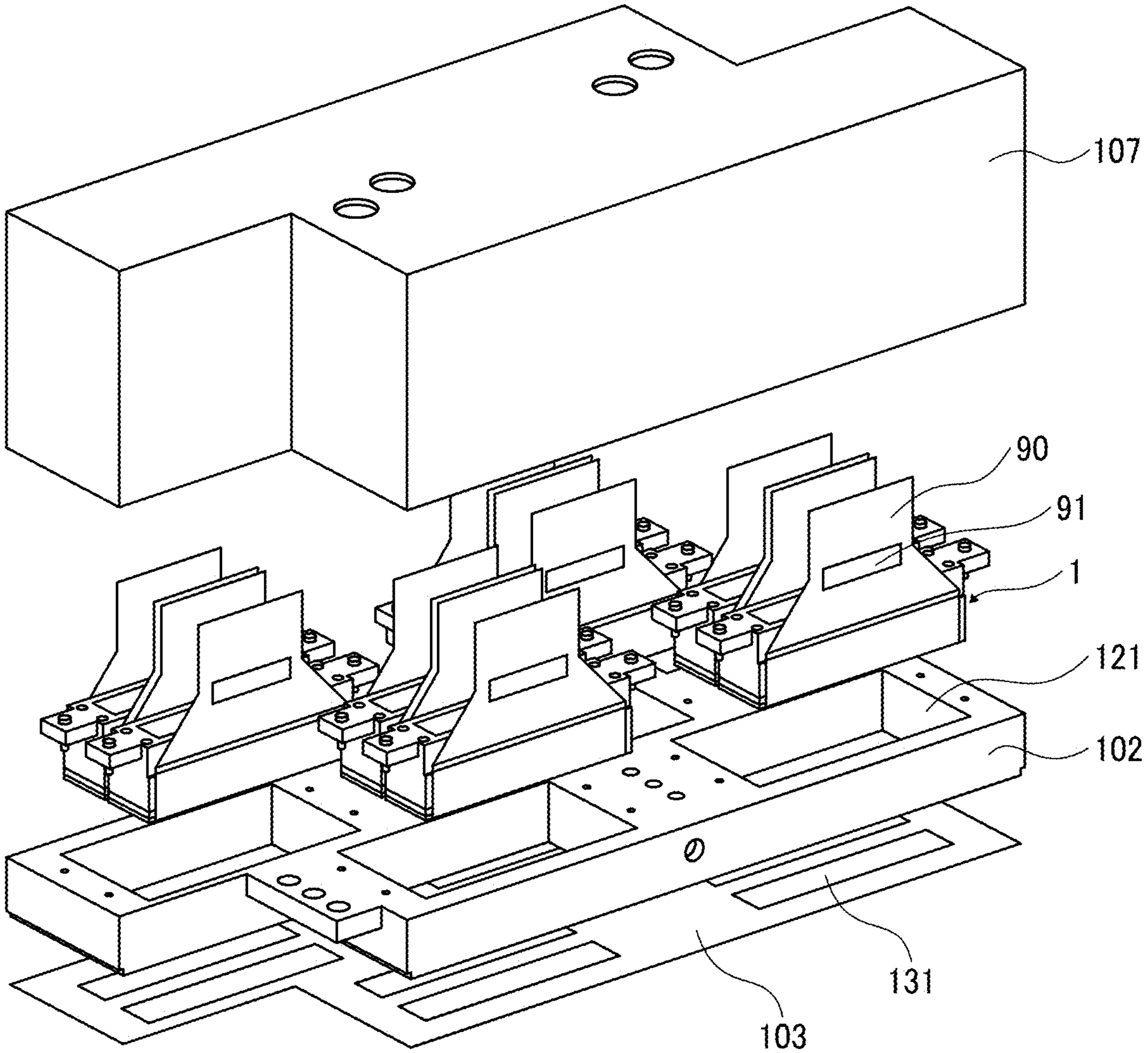
FIG. 8 is a perspective, exploded view of a base member, a head, and a cover member according to the present embodiment.
Figure 9:
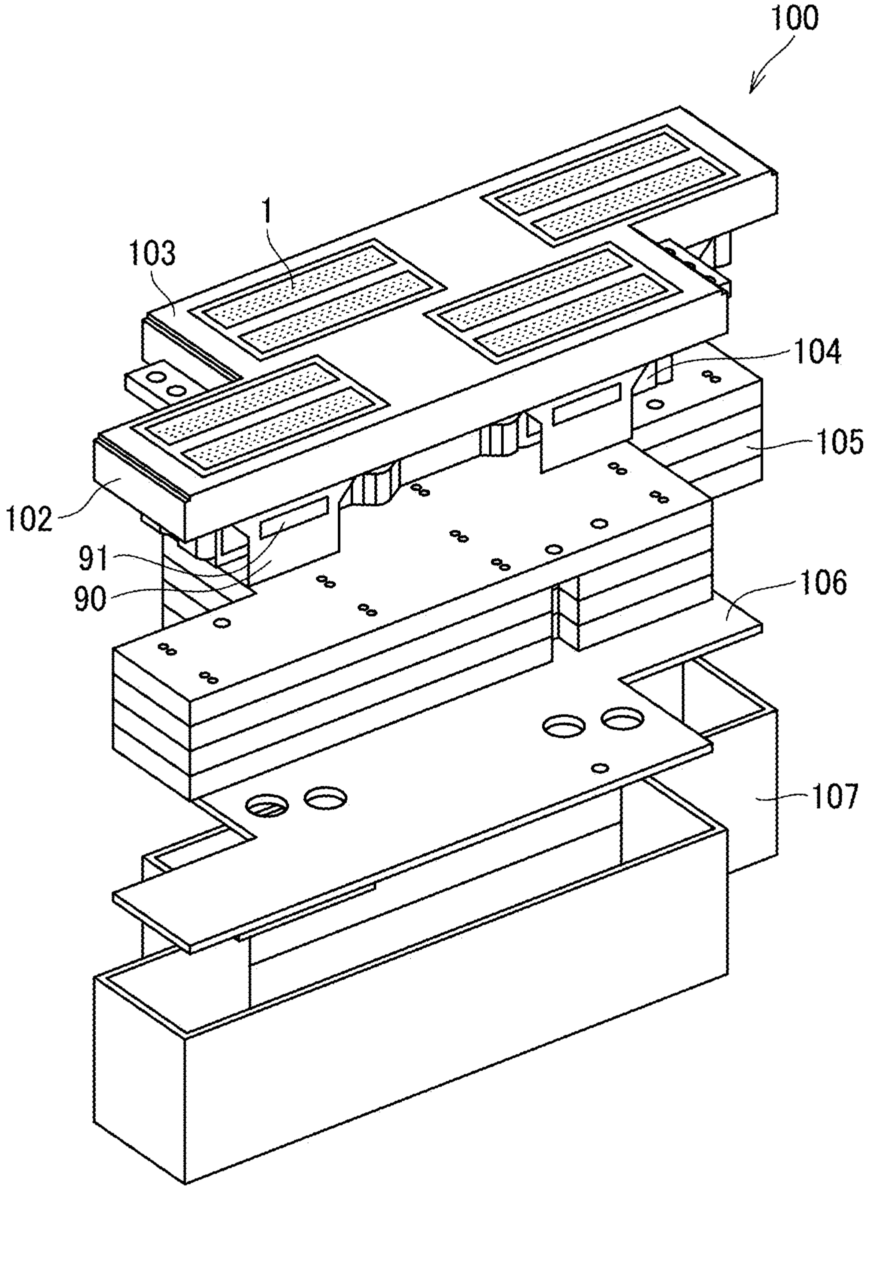
FIG. 9 is a perspective, exploded view of the head module according to the present embodiment when viewed from a nozzle surface side.
Figure 10:
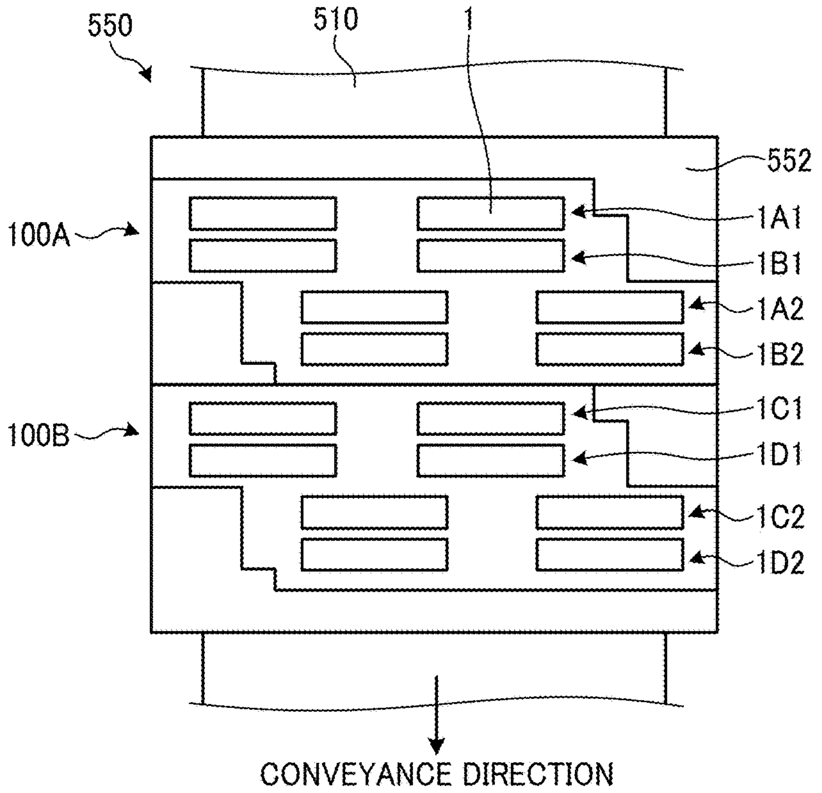
FIG. 10 is a schematic, plan view of an example of a liquid discharge unit including the head module.

(Head Module, Liquid Discharge Unit, and Liquid Discharge Apparatus) Next, an example of the head module according to the present embodiment will be described referring to FIGS. 6 to 9. FIG. 6 is a cross-sectional view of the head module according to the present embodiment along a head transverse direction. FIG. 7 is a perspective, exploded view of the head module according to the present embodiment. FIG. 8 is a perspective, exploded view of a base member, a head, and a cover member according to the present embodiment. FIG. 9 is a perspective, exploded view of the head module according to the present embodiment when viewed from a nozzle surface side.

A head module 100 includes a plurality of heads 1, a base member 102, a cover member 103, a heat radiator 104, a manifold 105, a printed circuit board 106 (PCB), and a module case 107. The head 1 is a liquid discharge head that discharges the liquid.

The plurality of heads 1 includes a nozzle plate 10, an individual channel plate 20, a diaphragm 30, an intermediate channel plate 50, and a common channel member 70, for example. The nozzles 11 are formed in the nozzle plate 10. The individual channel plate 20 forms an individual chamber 21 communicating with the nozzle 11. The diaphragm 30 includes a piezoelectric element 40. The intermediate channel plate 50 is laminated on the diaphragm 30. The common channel member 70 is laminated on the intermediate channel plate 50.

The individual channel plate 20 includes a supply-side individual channel 22 communicating with the individual chamber 21 and a collection-side individual channel 24 communicating with the individual chamber 21 together with the individual chamber 21.

The intermediate channel plate 50 forms a supply-side intermediate individual channel 51 and a collection-side intermediate individual channel 52. The supply-side intermediate individual channel 51 communicates with the supply-side individual channel 22 via an opening 31 of the diaphragm 30. The collection-side intermediate individual channel 52 communicates with the collection-side individual channel 24 via an opening 32 of the diaphragm 30.

The common channel member 70 forms a supply-side common channel 71 and a collection-side common channel 72. The supply-side common channel 71 communicates with the supply-side intermediate individual channel 51. The collection-side common channel 72 communicates with the collection-side intermediate individual channel 52. The supply-side common channel 71 communicates with a supply port 81 via a channel 151 of the manifold 105. The collection-side common channel 72 communicates with a collection port 82 via a channel 152 of the manifold 105.

The printed circuit board 106 and the piezoelectric element 40 of the head 1 are coupled via a flexible wiring member 90. The flexible wiring member 90 has a driver integrated circuit (drive circuit) 91 mounted thereon.

According to the present embodiment, the plurality of heads 1 is mounted on the base member 102 with a space interposed therebetween. The head 1 is inserted into an opening 121 provided in the base member 102, and a peripheral edge of the individual channel plate of the head 1 is bonded and secured to the cover member 103 bonded and secured to the base member 102 to attach the head 1 to the base member 102. A flange portion 70*a* provided outside the common channel member 70 of the head 1 is bonded and secured to the base member 102.

A structure of securing the head 1 to the base member 102 is not limited. For example, the head 1 may be secured to the base member 102 with bonding, caulking, screwing, or the like.

The base member 102 is preferably formed of a material having a low coefficient of linear expansion. For example, 42 alloy (alloy) with nickel added to iron or invar material may be used for forming the base member 102. According to the present embodiment, Invar material is used for forming the base member 102. Thus, the head 1 may reduce a displacement of the nozzles 11 from a predetermined nozzle position to reduce a displacement of a landing position of the liquid discharged from the nozzles 11 of the head 1 even if the head 1 generates heat so that the temperature of the base member 102 increases since an amount of a thermal expansion of the base member 102 is small.

Similarly, the nozzle plate 10, the individual channel plate 20, and the diaphragm 30 are formed of a silicon single-crystal substrate, and the coefficient of linear expansions of the base member 102, the nozzle plate 10, the individual channel plate 20, and the diaphragm 30 are made substantially the same.

Thus, the head 1 may reduce the displacement of relative positions of the nozzles 11 due to thermal expansion.

The liquid discharge unit according to the present embodiment includes the liquid discharge head according to the present embodiment or the head module according to the present embodiment. The liquid discharge unit may be referred to as "head unit", etc. FIG. illustrates an example of the liquid discharge unit according to the present embodiment. As illustrated in the figure, a head unit 550 includes two head modules 100A and 100B according to the present embodiment with a common base member 552.

The head module 100A includes head arrays 1A1, 1B1, 1A2, and 1B2. Each of the head arrays 1A1, 1B1, 1A2, and 1B2 includes the heads 1 arranged in array in a head array direction perpendicular to a conveyance direction of a sheet. The head module 100B includes head arrays 1C1, 1D1, 1C2, and 1D2. Each of the head arrays 1C1, 1D1, 1C2, and 1D2 includes the heads 1 arranged in array in the head array direction perpendicular to the conveyance direction of the sheet. The heads 1 in each of the head arrays 1A1 and 1A2 of the head module 100A discharge liquid of the same desired color. Similarly, the head arrays 1B1 and 1B2 of the head module 100A are grouped as one set that discharge liquid of the same desired color. The head arrays 1C1 and 1C2 of the head module 100B are grouped as one set that discharge liquid of the same desired color. The head arrays 1D1 and 1D2 of the head module 100B are grouped as one set to discharge liquid of the same desired color.

Figure 11:
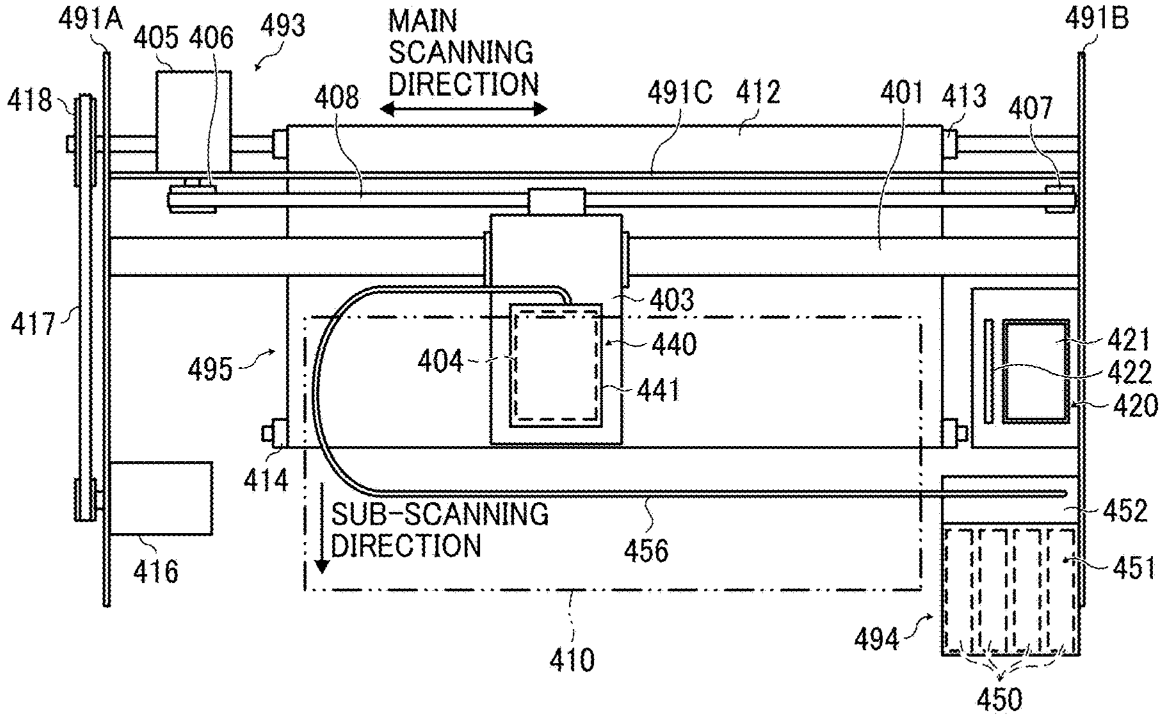
FIG. 11 is a schematic view of an example of a liquid discharge apparatus.
Figure 12:
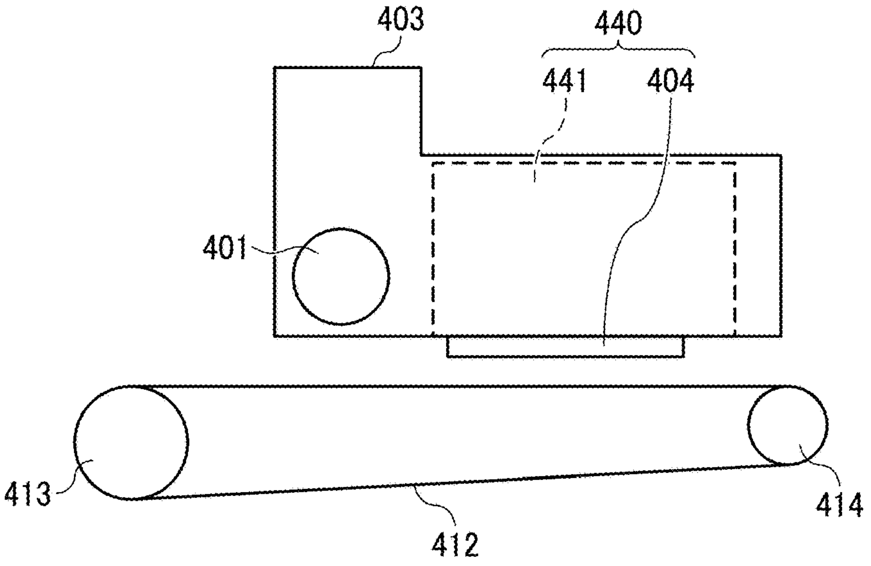
FIG. 12 is a schematic view of another example of the liquid discharge apparatus.

Next, an example of the liquid discharge apparatus according to the present embodiment will be described referring to FIGS. 11 and 12. FIG. 11 is a plan view of a part of the liquid discharge apparatus. FIG. 12 is a side view of the part of the liquid discharge apparatus.

The liquid discharge apparatus is a serial type apparatus. A carriage 403 reciprocally moves in a main scanning direction by a main scanning moving mechanism 493. The main scanning moving mechanism 493 includes a guide member 401, a main scanning motor 405, a timing belt 408, and the like. The guide member 401 is bridged between a left-side plate 491A and a right-side plate 491B to moveably hold the carriage 403. The main scanning motor 405 reciprocally moves the carriage 403 in the main scanning direction via the timing belt 408 bridged between a drive pulley 406 and a driven pulley 407.

The carriage 403 carries a liquid discharge unit 440 in which a liquid discharge head 404 according to the present embodiment and a head tank 441 are a single unit. The liquid discharge head 404 of the liquid discharge unit 440 discharges the liquid of each color, for example, yellow (Y), cyan (C), magenta (M), and black (K). The liquid discharge head 404 includes a nozzle array including a plurality of nozzles arrayed in a sub-scanning direction perpendicular to the main scanning direction. The liquid discharge head 404 is mounted so that ink droplets are discharged downward.

The liquids stored in liquid cartridges 450 are supplied to the head tank 441 by a supply mechanism 494 to supply the liquids stored outside the liquid discharge head 404 to the liquid discharge head 404.

The supply mechanism 494 includes a cartridge holder 451 serving as a filling part to mount the liquid cartridges 450, a tube 456, a liquid feed unit 452 including a liquid feed pump, and the like. The liquid cartridge 450 is detachably attached to the cartridge holder 451. The liquid is fed from the liquid cartridge 450 to the head tank 441 by the liquid feed unit 452 via the tube 456.

The liquid discharge apparatus includes a conveyance mechanism 495 to convey a sheet 410. The conveyance mechanism 495 includes a conveyance belt 412 as a conveyor and a sub-scanning motor 416 to drive the conveyance belt 412.

The conveyance belt 412 attracts the sheet 410 and conveys the sheet 410 to a position facing the liquid discharge head 404. The conveyance belt 412 is an endless belt stretched between a conveyance roller 413 and a tension roller 414. Attraction of the sheet 410 to the conveyance belt 412 may be applied by electrostatic adsorption, air suction, or the like.

The conveyance belt 412 rotates in the sub-scanning direction as the conveyance roller 413 is rotationally driven by the sub-scanning motor 416 via a timing belt 417 and a timing pulley 418.

At one side in the main scanning direction of the carriage 403, a maintenance mechanism 420 to maintain the liquid discharge head 404 is disposed on a lateral side of the conveyance belt 412.

The maintenance mechanism 420 includes, for example, a cap member 421 to cap a nozzle surface of the liquid discharge head 404, a wiper member 422 to wipe the nozzle surface, and the like. The nozzle surface is a surface on which the nozzles are formed.

The main scanning moving mechanism 493, the supply mechanism 494, the maintenance mechanism 420, and the conveyance mechanism 495 are mounted to a housing that includes the left-side plate 491A, the right-side plate 491B, and a rear-side plate 491C.

In the liquid discharge apparatus thus configured, the sheet 410 is conveyed on and attracted to the conveyance belt 412 and is conveyed in the sub-scanning direction by the cyclic rotation of the conveyance belt 412.

The liquid discharge head 404 is driven in response to image signals while the carriage 403 moves in the main scanning direction to discharge the liquid to the sheet 410 stopped, thus forming an image on the sheet 410.

Thus, the liquid discharge apparatus includes the liquid discharge head according to the present embodiment, which enables stable formation of high-quality images.

Figure 13:
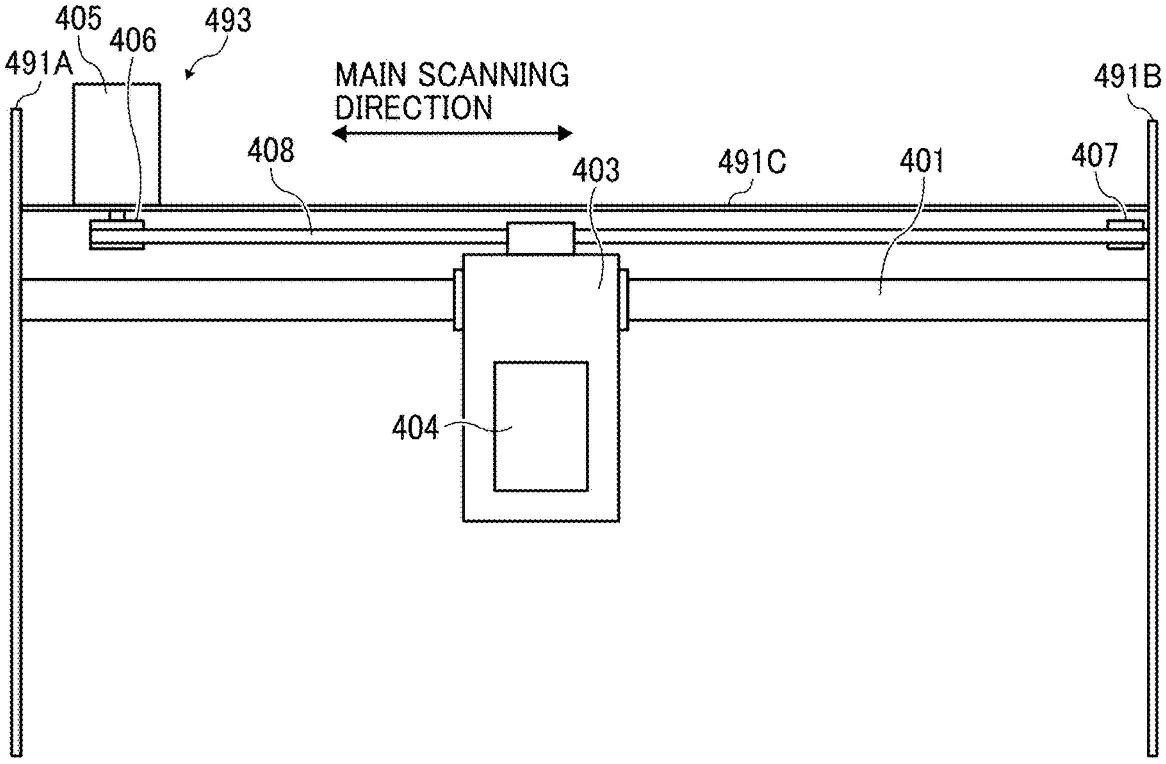
FIG. 13 is a schematic view of an example of the liquid discharge unit.

Next, another example of the liquid discharge unit according to the present embodiment will be described referring to FIG. 13. FIG. 13 is a plan view of a part of the liquid discharge unit according to the present embodiment.

The liquid discharge unit includes a housing portion, the main scanning moving mechanism 493, the carriage 403, and the liquid discharge head 404 among components of the liquid discharge apparatus. The left-side plate 491A, the right-side plate 491B, and the rear-side plate 491C form the housing.

The liquid discharge unit may be configured to further attach at least one of the above-described maintenance mechanism 420 and the supply mechanism 494 to, for example, the right-side plate 491B of the liquid discharge unit.

Figure 14:
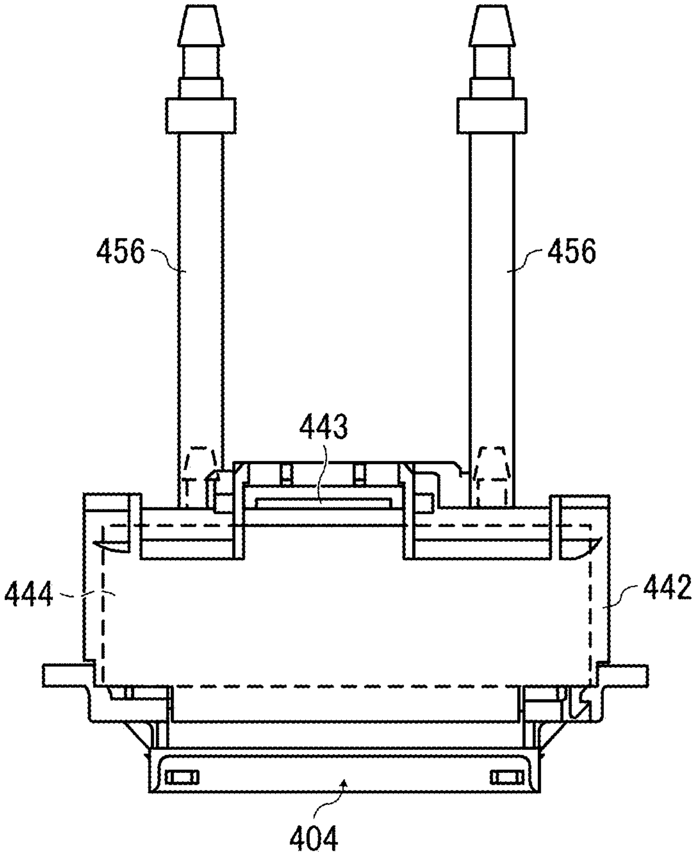
FIG. 14 is a schematic view of another example of the liquid discharge unit.

Next, a further another example of the liquid discharge unit according to the present embodiment will be described referring to FIG. 14. FIG. 14 is a front view of the liquid discharge device unit according to the present embodiment.

The liquid discharge unit includes the liquid discharge head 404 to which a channel part 444 is attached and the tube 456 coupled to the channel part 444.

Further, the channel part 444 is disposed inside a cover 442. Instead of the channel part 444, the liquid discharge unit may include the head tank 441. A connector 443 electrically connected with the liquid discharge head 404 is provided on an upper part of the channel part 444.

In the above-described embodiments, the "liquid discharge apparatus" includes the liquid discharge head or the liquid discharge unit and drives the liquid discharge head to discharge the liquid. The liquid discharge apparatus may be, for example, an apparatus that may discharge a liquid to a material to which liquid can adhere or an apparatus to discharge liquid toward gas or into liquid.

The "liquid discharge apparatus" may include units to feed, convey, and eject the material on which liquid can adhere. The liquid discharge apparatus may further include a pretreatment apparatus, a post-treatment apparatus, etc.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material on which liquid is at least temporarily adhered, a material on which liquid is adhered and fixed, or a material into which liquid is adhered to permeate. Examples of the "material on which liquid can adhere" include recording media, such as paper sheet, recording paper, recording sheet of paper, film, and cloth, electronic component, such as electronic substrate and piezoelectric element, and media, such as powder layer, organ model, and testing cell. The "material on which liquid can adhere" includes any material on which liquid can adhere, unless limited in particular.

Examples of the "material on which liquid can adhere" include any materials on which liquid can adhere even temporarily, such as paper, thread, fiber, fabric, leather, metal, plastic, glass, wood, ceramic, construction materials (e.g., wallpaper or floor material), and cloth textile.

Examples of the "liquid" include ink, treatment liquid, DNA sample, resist, pattern material, binder, fabrication liquid, and solution or liquid dispersion containing amino acid, protein, or calcium.

The "liquid discharge apparatus" may be an apparatus to relatively move the liquid discharge head and a material on which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the "liquid discharge apparatus" further include a treatment liquid coating apparatus to discharge a treatment liquid to a sheet to coat the treatment liquid on the surface of the sheet to reform the sheet surface and an injection granulation apparatus in which a composition liquid including raw materials dispersed in a solution is injected through nozzles to granulate fine particles of the raw materials.

The "liquid discharge unit" is an assembly of parts relating to liquid discharge. The term "liquid discharge unit" represents a structure including the liquid discharge head and a functional part(s) or mechanism combined to the liquid discharge head to form a single unit. For example, the "liquid discharge unit" includes a combination of the liquid discharge head with at least one of a head tank, a carriage, a supply mechanism, a maintenance mechanism, and a main scanning moving mechanism.

Examples of the "single unit" include a combination in which the liquid discharge head and one or more functional parts and units are secured to each other through, e.g., fastening, bonding, or engaging, and a combination in which one of the liquid discharge head and the functional parts and units is movably held by another. The liquid discharge head may be detachably attached to the functional part(s) or unit(s) each other.

For example, there is a liquid discharge unit in which the liquid discharge head and the head tank form a single unit, as in the liquid discharge unit 440 illustrated in FIG. 12. Alternatively, the liquid discharge head and the head tank coupled with a tube or the like may form the liquid discharge unit as a single unit. A unit including a filter may be added at a position between the head tank and the liquid discharge head of the liquid discharge unit.

In another example, the liquid discharge head and the carriage may form the liquid discharge unit as a single unit.

In still another example, the liquid discharge unit includes the liquid discharge head movably held by a guide member that forms part of the main scanning moving mechanism, so that the liquid discharge head and the main scanning moving mechanism form a single unit. Like the liquid discharge unit illustrated in FIG. 13, the liquid discharge head, the carriage, and the main scanning moving mechanism may form the liquid discharge unit as a single unit.

In still another example, a cap member that forms a part of the maintenance mechanism may be secured to the carriage mounting the liquid discharge head so that the liquid discharge head, the carriage, and the maintenance mechanism form a single unit to form the liquid discharge unit.

Like the liquid discharge unit illustrated in FIG. 14, the tube is coupled to the liquid discharge head mounting the head tank or the channel part so that the liquid discharge head and the supply mechanism form a single unit as the liquid discharge unit.

The main scanning moving mechanism may be a guide only. The supply mechanism may be a tube(s) only or a loading unit only.

The pressure generator used in the "liquid discharge head" is not limited to a particular type of pressure generator. The pressure generator is not limited to the piezoelectric actuator (or a laminated-type piezoelectric element) described in the above-described embodiments, and may be, for example, a thermal actuator that employs a thermoelectric transducer element, such as a thermal resistor, or an electrostatic actuator including a diaphragm and opposed electrodes.

The terms "image formation", "recording", "printing", "image printing", and "fabricating" used herein may be used synonymously with each other.

According to the present embodiment, it is possible to provide a liquid discharge head that uses the member that is easy to handle while preventing the increased burden of fabrication so as to prevent damages to the member.

[Aspect 1]

A liquid discharge head includes: a support member including a first recess and a second recess; and a damper member bonded to the support member, the damper member including a damper membrane, wherein the first recess faces the damper membrane, and the second recess is closer to an end of the support member than the first recess in a longitudinal direction of the support member, and the second recess does not face the damper membrane.

[Aspect 2]

The liquid discharge head according to aspect 1, further includes: an actuator substrate bonded to a face of the damper member opposite to another face of the damper member bonded the support member, the actuator substrate including a common chamber facing the damper membrane; and a nozzle substrate bonded to the actuator substrate, the nozzle substrate including a nozzle from which a liquid in the common chamber is to be discharged.

[Aspect 3]

In the liquid discharge head according to aspect 1, the second recess has a rectangular opening, one side of which is 1200 μm or more.

[Aspect 4]

In the liquid discharge head according to aspect 1, the second recess is on one end in the longitudinal direction of the support member.

[Aspect 5]

In the liquid discharge head according to aspect 1, the second recess is on both ends in the longitudinal direction of the support member.

[Aspect 6]

In the liquid discharge head according to aspect 1, the support member is bonded to the damper member with an adhesive, the support member includes multiple third recesses, the multiple third recesses are adjacent to each other and disposed closer to the end of the support member than the first recess in the longitudinal direction of the support member, each of the multiple third recesses faces the damper membrane, and the adhesive is escapable into the multiple third recesses.

[Aspect 7]

In the liquid discharge head according to aspect 6, an opening area of each of the multiple third recesses is smaller than an opening area of the first recess.

[Aspect 8]

In the liquid discharge head according to aspect 6, the multiple third recesses are adjacent to the second recess in a transverse direction orthogonal to the longitudinal direction.

[Aspect 9]

A head module includes the liquid discharge head according to aspect 1 including multiple liquid discharge heads.

[Aspect 10]

A liquid discharge unit includes the head module according to aspect 9 including multiple liquid discharge modules.

[Aspect 11]

The liquid discharge unit according to aspect 10, further comprising at least one of: a head tank configured to store a liquid to be supplied to the liquid discharge head; a carriage mounting the liquid discharge head; a supply mechanism configured to supply a liquid to the liquid discharge head; a maintenance mechanism configured to maintain the liquid discharge head; or a main scanning moving mechanism that moves the liquid discharge head in a main scanning direction, combined with the liquid discharge head.

[Aspect 12]

A liquid discharge apparatus includes the liquid discharge unit according to aspect 10.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head, comprising:

a support member including a first recess and a second recess;

a damper member including a damper membrane, wherein a first face of the damper member is bonded to the support member in a stacking direction;

a nozzle substrate; and an actuator substrate bonded to a second face of the damper member opposite to the first face the damper member, the actuator substrate including a common chamber facing the damper membrane, wherein the damper member is between the support member and the actuator substrate in the stacking direction, the actuator substrate is between the nozzle substrate and the damper member in the stacking direction, the nozzle substrate is bonded to the actuator substrate, the nozzle substrate includes a nozzle from which a liquid in the common chamber is to be discharged, the first recess is opposed to the common chamber via the damper membrane in the stacking direction, the damper membrane preventing the liquid in the common chamber from flowing in the first recess, the second recess is at an end of the support member in a longitudinal direction of the support member, the longitudinal direction being orthogonal to the stacking direction, and the second recess does not face the damper member in the stacking direction.

2. The liquid discharge head according to claim 1, wherein the second recess has a rectangular opening, one side of which is 1200 μm or more.

3. The liquid discharge head according to claim 1, wherein the second recess is on one end in the longitudinal direction of the support member.

4. The liquid discharge head according to claim 1, wherein the second recess is on both ends in the longitudinal direction of the support member.

5. The liquid discharge head according to claim 1, wherein an opening of the first recess faces the damper member in the stacking direction, and an opening of the second recess does not face the damper member in the stacking direction.

6. The liquid discharge head according to claim 1, wherein the support member is bonded to the damper member with an adhesive, the support member includes multiple third recesses, the multiple third recesses are adjacent to each other and disposed closer to the end of the support member than the first recess in the longitudinal direction of the support member, each of the multiple third recesses faces the damper membrane, and the adhesive is escapable into the multiple third recesses.

7. The liquid discharge head according to claim 6, wherein an opening area of each of the multiple third recesses is smaller than an opening area of the first recess.

8. The liquid discharge head according to claim 6, wherein the multiple third recesses are adjacent to the second recess in a transverse direction orthogonal to the longitudinal direction.

9. A head module, comprising:

a plurality of liquid discharge heads, including the liquid discharge head according to claim 1.

10. A liquid discharge unit, comprising:

the head module according to claim 9 including the plurality of liquid discharge modules.

11. The liquid discharge unit according to claim 10, further comprising at least one of:

a head tank to store a liquid to be supplied to the liquid discharge head;

a carriage mounting the liquid discharge head;

a supply mechanism configured to supply a liquid to the liquid discharge head;

a maintenance mechanism configured to maintain the liquid discharge head; or a main scanning moving mechanism that moves the liquid discharge head in a main scanning direction, combined with the liquid discharge head.

12. A liquid discharge apparatus, comprising:

the liquid discharge unit according to claim 10.

* * * * *